(12) United States Patent  (10) Patent No.: US 8,223,425 B2
Hashimura et al.  (45) Date of Patent: Jul. 17, 2012

(54) PLASMONIC DEVICE TUNED USING PHYSICAL MODULATION

(75) Inventors: Akinori Hashimura, Vancouver, WA (US); Liang Tang, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 385 days.

(21) Appl. No.: 12/646,585

(22) Filed: Dec. 23, 2009

(65) Prior Publication Data
US 2011/0109956 A1 May 12, 2011

Related U.S. Application Data

(63) Continuation-in-part of application No. 12/635,349, filed on Dec. 10, 2009, which is a continuation-in-part of application No. 12/621,567, filed on Nov. 19, 2009, which is a continuation-in-part of application No. 12/614,368, filed on Nov. 6, 2009, now Pat. No. 8,045,107.

(51) Int. Cl.
G02B 26/00 (2006.01)
(52) U.S. Cl. ...................................... 359/296
(58) Field of Classification Search .................. 359/296, 359/578, 900; 257/415
See application file for complete search history.

(56) References Cited

U.S. PATENT DOCUMENTS 6,122,091 A * 9/2000 Russell et al. ................ 359/245
2009/0034055 A1 2/2009 Gibson

OTHER PUBLICATIONS

J. N. Anker, et al, "Biosensing with plasmonic nanosensors", Nature Materials 7, 447 (2008).
R. Patil et al, "Novel Polyaniline/PVD/BaTiO3 Hybrid Composites with High Piezo-Sensitivity", Sensors and Actuators A 138 (2007), 361-365. 2007.
C. E. Rayford II et al, "Optical Properties of Gold Nanoparticles", Nanoscape vol. 2, Issue 1, Spring 2005.

* cited by examiner

*Primary Examiner* — Ricky Mack
*Assistant Examiner* — Vipin Patel
(74) *Attorney, Agent, or Firm* — Law Office of Gerald Maliszewski; Gerald Maliszewski

(57) ABSTRACT

A plasmonic display device is provided that uses physical modulation mechanisms. The device is made from an electrically conductive bottom electrode and a first dielectric layer overlying the bottom electrode. The first dielectric layer is a piezoelectric material having an index of expansion responsive to an electric field. An electrically conductive top electrode overlies the first dielectric layer. A first plasmonic layer, including a plurality of discrete plasmonic particles, is interposed between the top and bottom electrodes and in contact with the first dielectric layer. In one aspect, the plasmonic particles are an expandable polymer material covered with a metal coating having a size responsive to an electric field.

5 Claims, 9 Drawing Sheets

(PENDING ART)

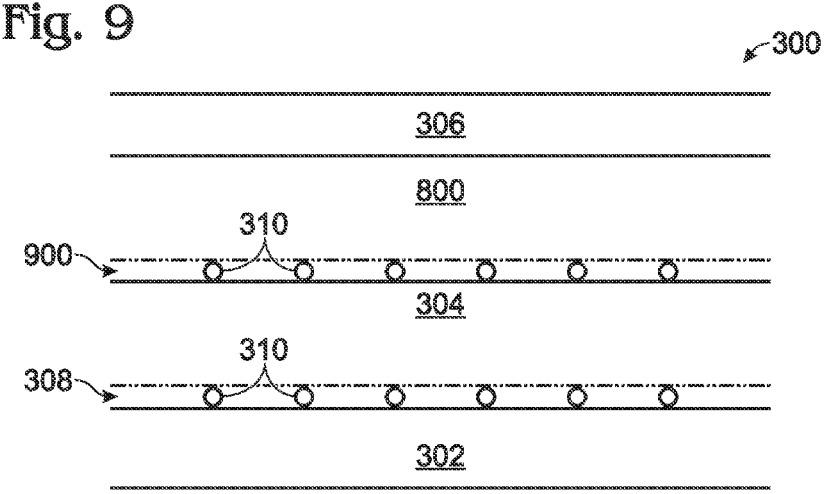
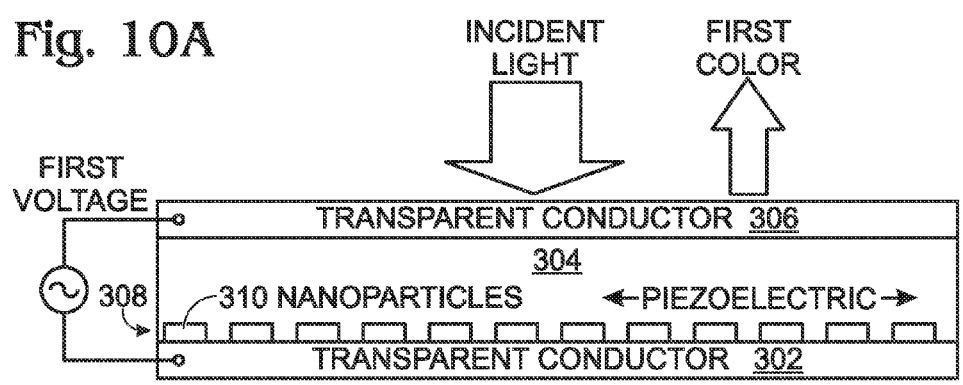
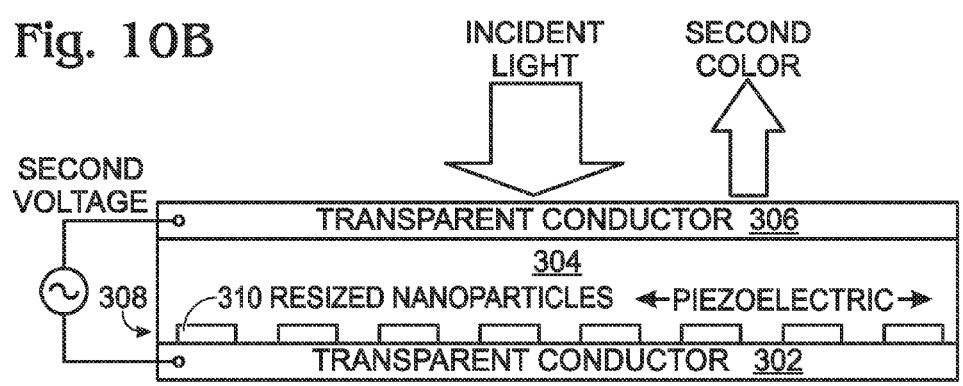

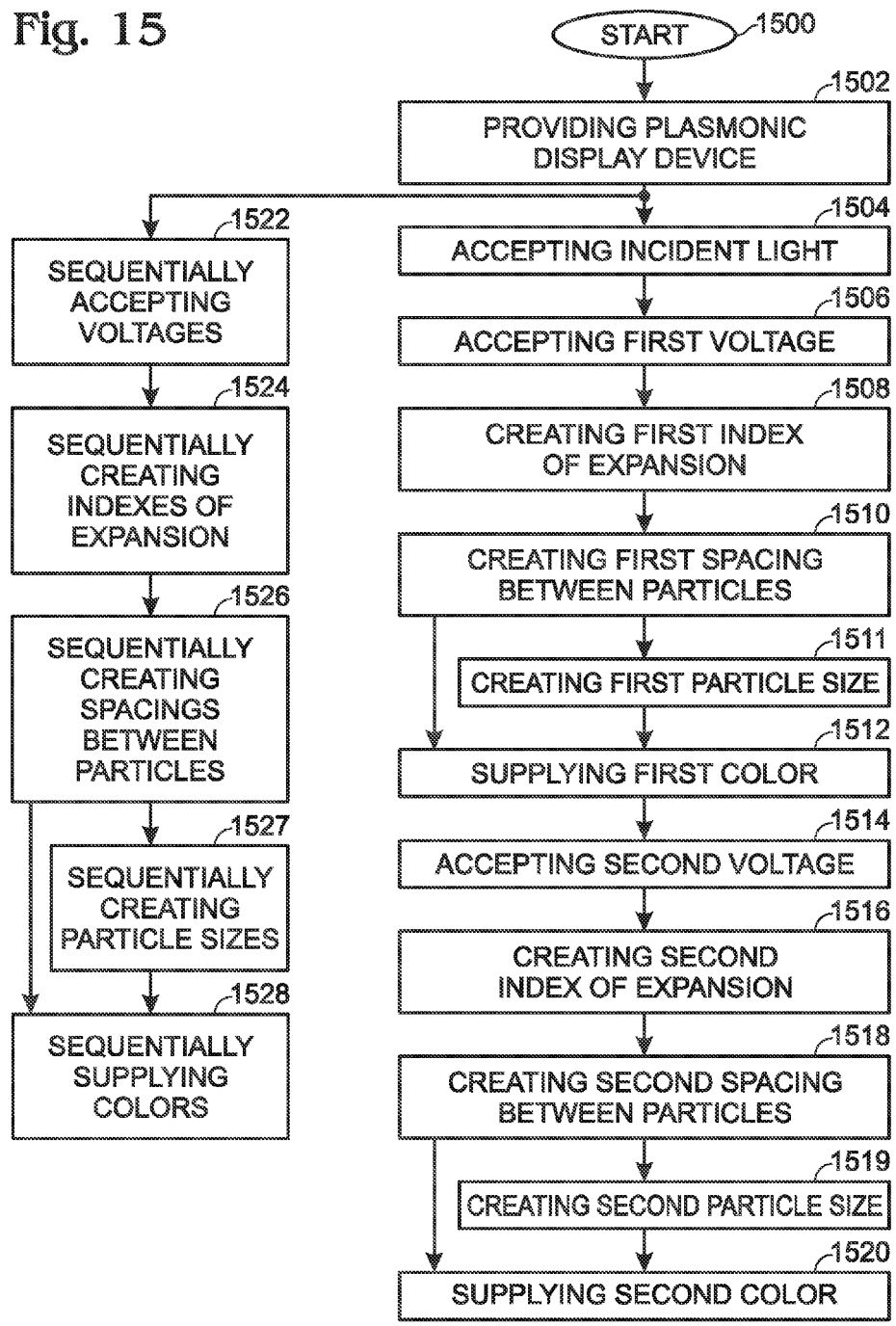

PLASMONIC DEVICE TUNED USING PHYSICAL MODULATION

RELATED APPLICATION

The application is a Continuation-in-Part of a pending application entitled, PLASMONIC DEVICE TUNED USING LIQUID CRYSTAL MOLECULE DIPOLE CONTROL, invented by Tang et al., Ser. No. 12/635,349, filed on Dec. 10, 2009.

which is a Continuation-in-Part of a pending application entitled, PLASMONIC DEVICE TUNED USING ELASTIC AND REFRACTIVE MODULATION MECHANISMS, invented by Tang et al., Ser. No. 12/621,567, filed on Nov. 19, 2009.

which is a Continuation-in-Part of a pending application entitled, COLOR-TUNABLE PLASMONIC DEVICE WITH A PARTIALLY MODULATED REFRACTIVE INDEX, invented by Tang et al., Ser. No. 12/614,368, filed on Nov. 6, 2009, now U.S Pat. No. 8,045,107. All the above-referenced applications are incorporated herein by reference.

BACKGROUND OF THE INVENTION

1. Field of the Invention

This invention generally relates to electronic visual display devices and, more particularly, to a color-tunable plasmonic display device that relies upon an physical modulation means.

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

A number of different reflective display technologies have been developed, such as electrophoretic, electrowetting, electrochromic displays, and interference-based MEMS display. These display technologies all have disadvantages or challenges that must be overcome to obtain greater commercial success. Many existing technologies rely upon phenomena that are intrinsically slow. For example, electrophoretic or electrochemical techniques typically require particles to drift or diffuse through liquids over distances that create a slow response. Some other technologies require high power to operate at video rates. For example, many reflective displays must switch a large volume of material or chromophores from one state to another to produce an adequate change in the optical properties of a pixel. At video switching rates, currents on the order of hundreds of mA/cm$^2$ are necessary if a unit charge must be delivered to each dye molecule to affect the change. Therefore, display techniques that rely on reactions to switch dye molecules demand unacceptably high currents for displaying video. The same holds true for electrochromic displays.

A second challenge for reflective displays is the achievement of high quality color. In particular, most reflective display technologies can only produce binary color (color/black) from one material set. To create a full color spectrum at least three sub-pixels, using different material sets, must be used when employing a side-by-side sub-pixel architecture with fixed colors. This limits the maximum reflected light for some colors to about ⅓, so that the pixels of this type cannot produce saturated colors with a good contrast.

Some reflective displays face reliability problem over a long lifetime. In particular, to sustain video rate operation for a few years requires at least billions of reversible changes in optical properties. Achieving the desired number of cycles is particularly difficult in reflective displays using techniques based on chemical reactions, techniques that involve mixing and separation of particles, or MEMS technology that involves repeated mechanic wear or electric stress.

FIG. 1 is a partial cross-sectional view of nanoplasmonic display in which the color tuning is accomplished by electrical modulation of the refractive index of an electro-optical material such as a liquid crystal (pending art). Details of the device 100 can be found in the pending application entitled, COLOR-TUNABLE PLASMONIC DEVICE WITH A PARTIALLY MODULATED REFRACTIVE INDEX, invented by Tang et al., Ser. No. 12/614,368. Because of the limited refractive index (n) change of dielectric 106 materials such as liquid crystal, the color tuning range of a device using just this tuning modulation means is very limited. Thus, the device of FIG. 1 uses an additional color tuning mechanism, as described below.

FIG. 2 is a graph simulating the relationship between resonant wavelength change and refractive index for a liquid crystal material surrounding an Ag nanoparticle with a diameter of 80 nanometers. For example, the highest birefringence liquid crystal commercially available only has a Δn of 0.3, which provides a tuning range of only 80 nm, based on the simulation result in FIG. 2. Research labs have reported liquid crystals with a Δn as high as 0.79, but the performance of such materials is not guaranteed. Besides, these materials may not have the appropriate response time or threshold voltage required for the nanoplasmonic display application.

Retuning to FIG. 1, the color tuning range of a plasmonic device can be improved with the addition of a second dielectric layer 104, which has a refractive index that is non-responsive to an electric field.

It would be advantageous if further improvements in the color range of a plasmonic device could be obtained by additional mechanisms, other than changing the refractive index of the dielectric materials.

SUMMARY OF THE INVENTION

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics.

The tuning of the refractive index of a surrounding dielectric material such as liquid crystal may be limited by the material itself. For example, commercially available liquid crystal possesses a change in the index of refraction of ~0.3. For realizing a full color reflective display, a larger change in index of refraction may be needed, with more than one pixel necessary to achieve the entire visual spectrum.

The full range of colors produced by plasmon resonances can be tuned not only by changing the refractive index of the surrounding medium, but also by altering the size and shape of nanoparticles. In one aspect, nanoparticles are embedded in a piezoelectric material. When the electric field is applied between the top and bottom electrodes, a force is applied perpendicular to the substrate, stretching the piezoelectric material laterally. The size to which the embedded nanoparticles are stretched corresponds to the strength of the applied voltage (the lateral movement of the piezoelectric material). Some examples of piezoelectric materials include quartz, AlN, PZT, and ZnO. Alternately, the nanoparticles may be expanded and compressed by applying an electric field to an expandable polymer nanoparticle, covered with a thin layer of metallic coating. The expandable particles can then be stretched or compressed depending on the applied electric field.

Accordingly, a plasmonic display device is provided that uses physical modulation mechanisms. The device is made from an electrically conductive bottom electrode and a first dielectric layer overlying the bottom electrode. The first dielectric layer is a piezoelectric material having an index of expansion responsive to an electric field. An electrically conductive top electrode overlies the first dielectric layer. A first plasmonic layer, including a plurality of discrete plasmonic particles, is interposed between the top and bottom electrodes and in contact with the first dielectric layer. Thus, the plasmonic particles have a first average spacing between particles in response to a first electric field between the top and bottom electrodes, and a second average spacing between particles in response to a second electric field.

In one aspect, the plasmonic particles are an expandable polymer material covered with a metal coating having a size responsive to an electric field. That is, the plasmonic particles have a first average size in response to the first electric field between the top and bottom electrodes, and a second average size in response to the second electric field. For example, the plasmonic particle polymer material may be $BaTiO_3$ or polyvinylidene fluoride (PVDF).

Additional details of the above-described plasmonic display device, as well as a method for creating colors in the visible spectrum using a tunable plasmonic device with physical modulation mechanisms, are provided below.

BRIEF DESCRIPTION OF THE DRAWINGS

FIG. 9 is a partial cross-sectional view of a variation of the plasmonic display device of FIG. 8.

FIGS. 10A and 10B are partial cross-sectional views depicting a process for color tuning the plasmonic device of FIG. 3.

FIG. 15 is a flowchart illustrating a method for creating colors in the visible spectrum using a physical modulation plasmonic display device.

DETAILED DESCRIPTION

Figure 1:
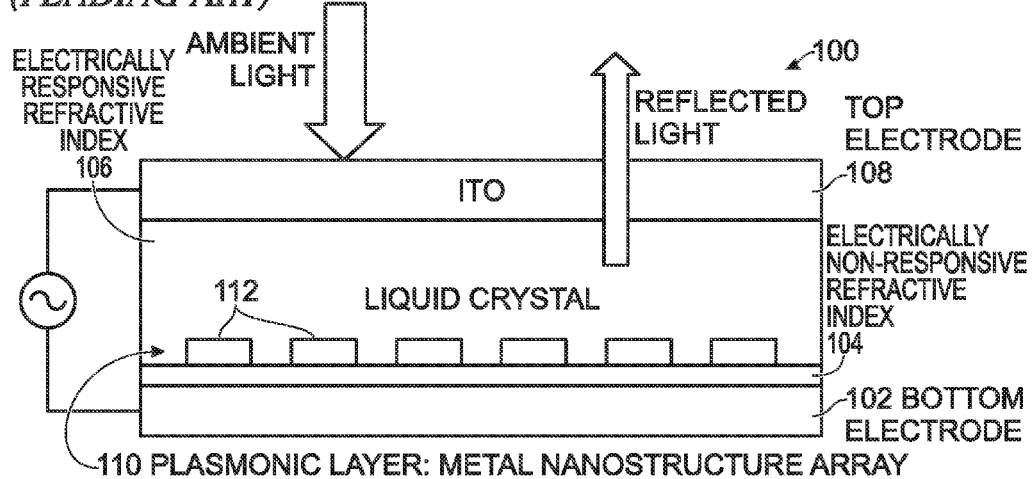
FIG. 1 is a partial cross-sectional view of nanoplasmonic display in which the color tuning is accomplished by electrical modulation of the refractive index of an electro-optical material such as a liquid crystal (pending art).
Figure 2:
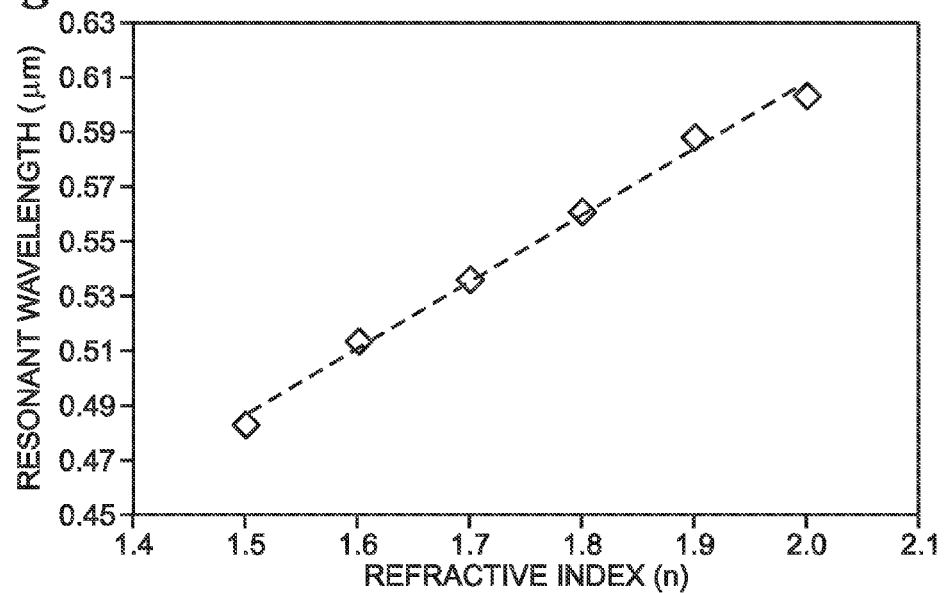
FIG. 2 is a graph simulating the relationship between resonant wavelength change and refractive index for a liquid crystal material surrounding an Ag nanoparticle with a diameter of 80 nanometers.
Figure 3:
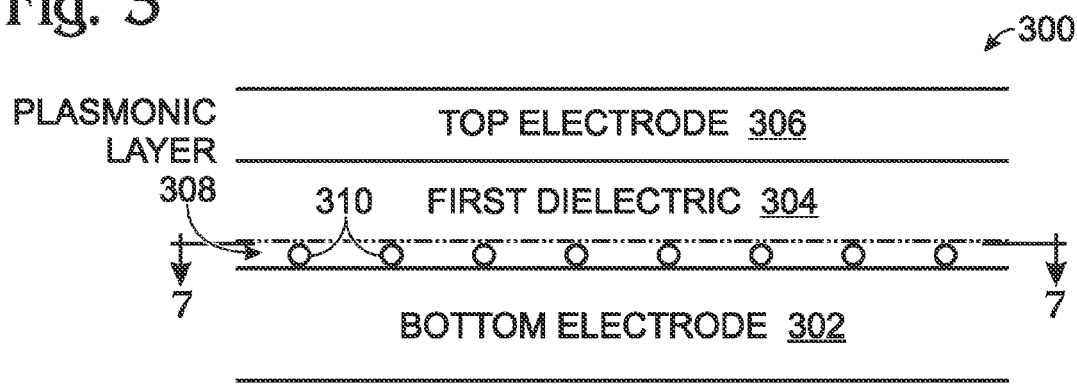
FIG. 3 is a partial cross-sectional view of a plasmonic display device using physical modulation mechanisms.

FIG. 3 is a partial cross-sectional view of a plasmonic display device using physical modulation mechanisms. The device 300 comprises an electrically conductive bottom electrode 302 and a first dielectric layer 304 overlying the bottom electrode. The first dielectric layer 304 is made from a piezoelectric material having an index of expansion responsive to an electric field. An electrically conductive top electrode 306 overlies the first dielectric layer 304. A first plasmonic layer 308, including a plurality of discrete plasmonic particles 310, is interposed between the top electrode 306 and the bottom electrode 302. The first plasmonic layer 308 is in contact with the first dielectric layer 304. For example, the first dielectric may be a material such as lead zicronate titanate (PZT) or aluminum nitride (AlN). As shown in FIG. 3, the first plasmonic layer 308 is embedded in the first dielectric layer 304.

In one aspect, the bottom electrode 302 and top electrode 306 are transparent to a first range of wavelengths in the visible spectrum of light, made from a material such as indium tin oxide (ITO) or ZnO. In this case, the device 300 is transmissive—accepting ambient (white) light and passing a tuned color. Since the metal nanoparticles reflect light, the device may be considered both transmissive and reflective. That is, the device reflects a tuned color and passes another tuned color.

Figure 4:
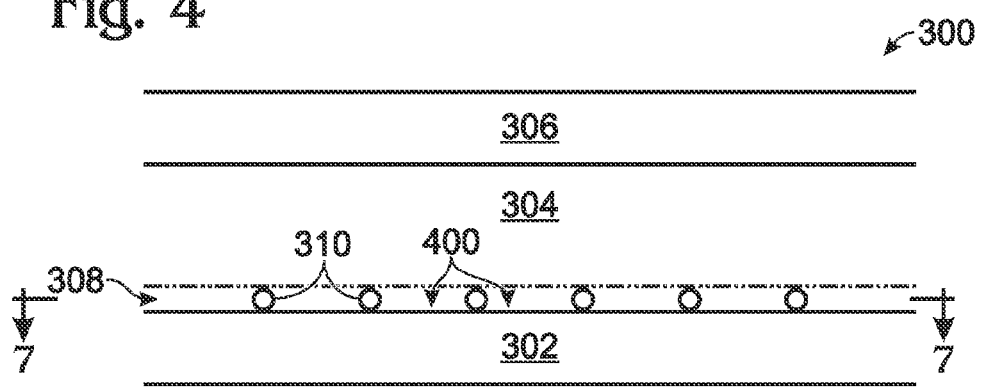
FIG. 4 is a partial cross-sectional view of a first variation of the plasmonic display device of FIG. 3.

FIG. 4 is a partial cross-sectional view of a first variation of the plasmonic display device of FIG. 3. In this aspect the first plasmonic layer 308 overlies the bottom electrode 302. The first dielectric layer 304 overlies the first plasmonic layer particles 310 and exposed regions 400 of the bottom electrode between the first plasmonic layer particles.

Figure 5A:
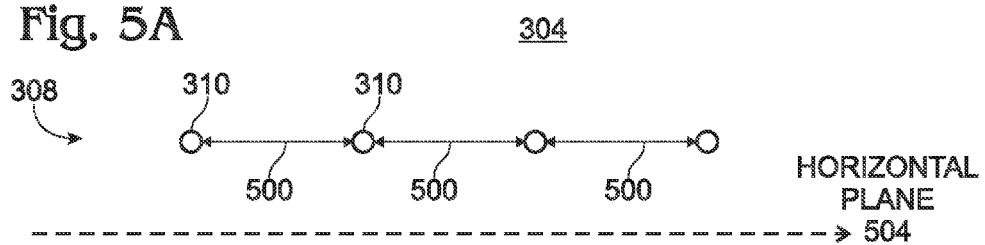
FIGS. 5A and 5B are partial cross-sectional views of the first plasmonic layer of FIG. 3 or 4 in greater detail.
Figure 5B:
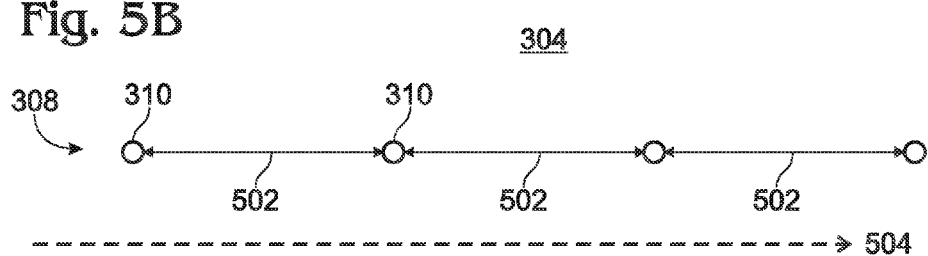

FIGS. 5A and 5B are partial cross-sectional views of the first plasmonic layer of FIG. 3 or 4 in greater detail. As shown in FIG. 5A, the plasmonic particles 310 have a first average spacing 500 between particles in response to a first electric field between the top and bottom electrodes. Note: since the spacing between particles need not necessarily be uniform, the concept of an average spacing is introduced for comparison under the influence of different strength electric fields. That is, the spacing between any two particles in the horizontal plane 504 varies in response to the strength of the electric field (the voltage applied between the top and bottom electrodes). In FIG. 5B, a second average spacing 502 exists between particles 310 in response to a second electric field.

Alternately stated, the first dielectric material 304 has a first index of expansion in response to the first electric field between the top and bottom electrodes, and a second index of expansion in response to the second electric field. As used herein, the index of expansion is related to the elasticity of a material, and ultimately defines the average distance between particles in the first dielectric material. Since it is possible for the first dielectric material to contract with respect to a reference condition, the expansion index may be understood to be expressed with both positive, and negative coefficients.

Figure 6A:
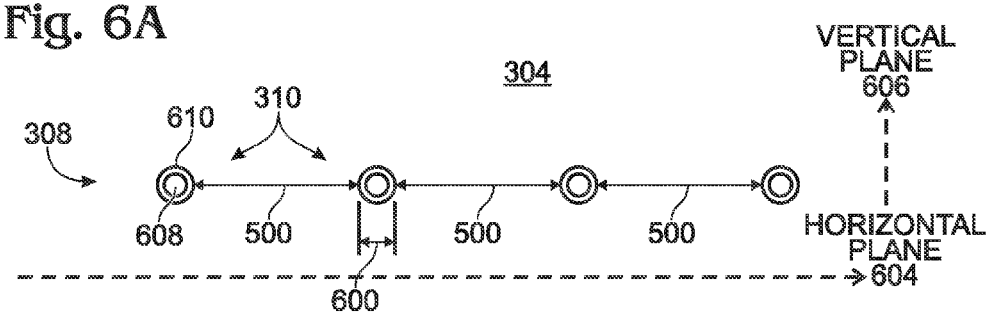
FIGS. 6A and 6B are partial cross-sectional views of a variation of the first plasmonic layer depicted in FIGS. 5A and 5B.
Figure 6B:
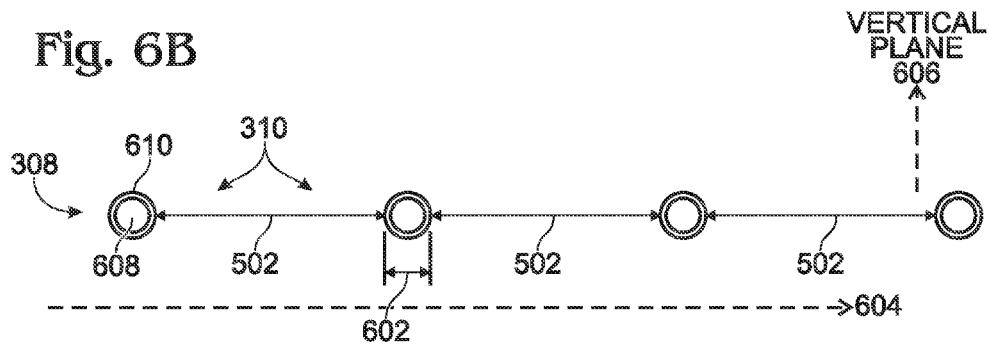

FIGS. 6A and 6B are partial cross-sectional views of a variation of the first plasmonic layer depicted in FIGS. 5A and 5B. In this aspect, the index of expansion of the first dielectric 304 still varies as a function of the electric field, so that the spacing between plasmonic particles is affected, as described above in the explanation of FIGS. 5A and 5B. The particles 310 in FIGS. 6A and 6B provide an additional physical modulation mechanism—change of size. That is, the plasmonic particles 310 are an expandable polymer material 608 covered with a metal coating 610 having a size responsive to an electric field. In FIG. 6A, the plasmonic particles 310 have a first average size 600 in response to a first electric field between the top and bottom electrodes. In FIG. 6B, the particles 310 have a second average size 602 in response to a second electric field. That is, the size of each particle varies in response to the strength of the electric field (the voltage applied between the top and bottom electrodes). More explicitly, the size of the particles changes primarily in the radial direction of the particle surface (see FIGS. 14A and 14B). For example, the polymer material 608 may be $BaTiO_3$ or polyvinylidene fluoride (PVDF).

Figure 7A:
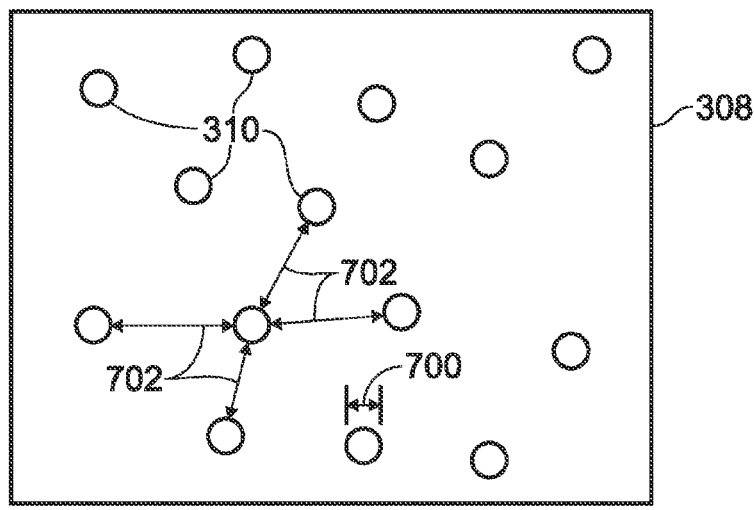
FIGS. 7A and 7B are plan views of the plasmonic layer of FIG. 3 or 4.
Figure 7B:
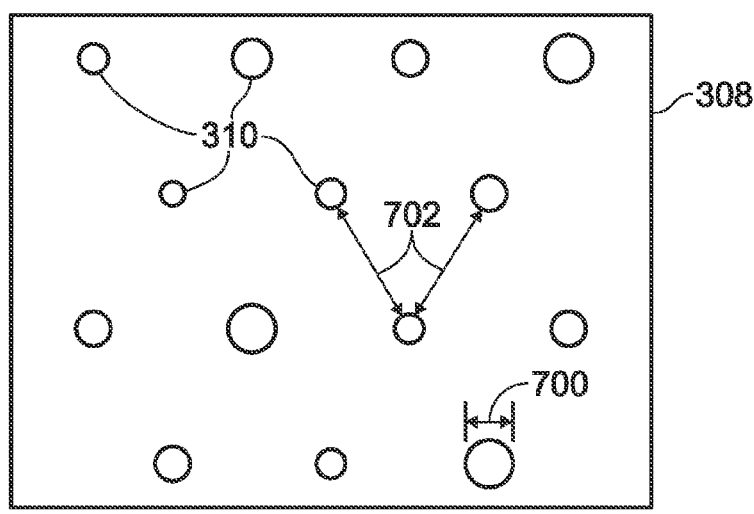

FIGS. 7A and 7B are plan views of the plasmonic layer of FIG. 3 or 4. Generally, the plasmonic particles 310 in the plasmonic layer 308 may be arranged in a random order or symmetrical array. In FIG. 7A, the particles 310 are randomly distributed. Random order is defined as a non-uniform 3-D spacing between particles. In FIG. 7B the plasmonic particles 310 are in a two-dimensional triangular array. The plasmonic particles 310 in the first plasmonic layer 308 may be comprised of a uniform particle structure (shape) or a plurality of different particle structures. Some examples of particle structures include spherical, disk, composite shell, dome, egg, cup, rod, bar, pyramid, and star. Note: the composite shell structure may comprise a metal core surrounded by a dielectric shell, or a dielectric core surrounded by a metal shell. In one aspect, the composite shell dielectric may have a refractive index that varies in response to electric fields. Note: the device may be enabled using other structures, as an exhaustive collection of structures and shapes in not shown.

Likewise, the plasmonic particles 310 in the first plasmonic layer may have a uniform size (diameter) or comprise a plurality of different particle sizes. Typically, the plasmonic particles 310 have a size 700 in the range of 10 nanometers (nm) to 300 nm. Typically, the plasmonic particles 310 have an average spacing 702 between particles, which is in the range of about 700 nm, or less.

The plasmonic particles 310 in the first plasmonic layer may be made of the same material or a variety of different materials. Some examples of plasmonic shell materials (610, see FIGS. 6A and 6B) include Ag, Au, Cu, Pt, Al, and alloys of the above-mentioned metals. Note: if two or more plasmonic layers are used (as described below), the different layers need not necessarily use the same plasmonic particles sizes, shapes, material, spacings, or ordering.

Figure 8:
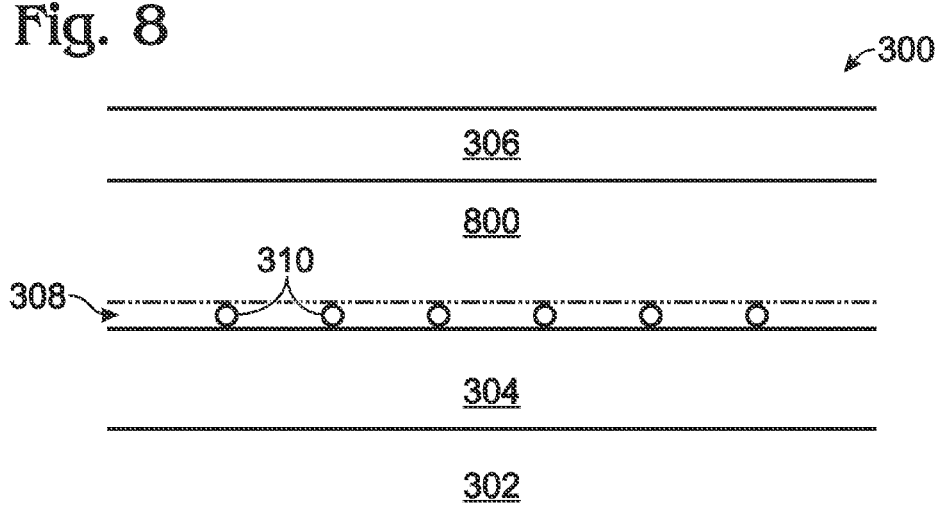
FIG. 8 is a partial cross-sectional view of a second variation of the plasmonic display device of FIG. 3.

FIG. 8 is a partial cross-sectional view of a second variation of the plasmonic display device of FIG. 3. In this aspect, the device 300 further comprises a second dielectric layer 800 overlying the first dielectric layer 304. The second dielectric layer has a refractive index that may be either responsive or non-responsive to an electric field. If the second dielectric layer 800 has a refractive index non-responsive to an electric field, it may be a material such as SiOx, SiNx, SiOxNy, MgF2, CaF2, SiOC, amorphous fluoropolymers, or organic polymers. However, this is not an exhaustive list of materials. It should be understood that although only a two dielectric layer structure is shown, the same principles can be applied to create devices with additional dielectric layers. In this aspect, the plasmonic layer 308 is interposed between dielectric layers 304 and 800. Alternately but not shown, the plasmonic layer may be embedded in the first dielectric, as in FIG. 3, or interposed between the bottom electrode and first dielectric layer, as in FIG. 4.

If the second dielectric has an index of refraction responsive to an electric field, it may be a material such as ferroelectric liquid crystals, nematic liquid crystals, LiNbO3, Hg2Cl2, LiTaO3, BBO, KTP, or organic electro-optical crystal 2,6-dibromo-N-methyl-4-nitroaniline. Otherwise, the material may be a liquid crystal elastomer or polymer-networked liquid crystal. Typically, the second dielectric 800 may have a refractive index that varies between 1.0 and 3, in any direction, in response to an electric field. Since refractive index is direction-dependent, the refractive index value may be defined as the "effective" value or "average" value, as well as the individual component value (along a particular direction).

FIG. 9 is a partial cross-sectional view of a variation of the plasmonic display device of FIG. 8. In this aspect the plasmonic display device further comprises a second plasmonic layer 900 of plasmonic particles 310 interposed between the first and second dielectric layers 304/800. Note: the particles in the two plasmonic layers may, or may not have the same sizing, spacing, and organization. Likewise, the particles need not be made from the same materials. In this aspect, the plasmonic layer 308 is embedded in the first dielectric, as in FIG. 3. Alternately but not shown, the plasmonic layer may be interposed between the bottom electrode and first dielectric layer, as in FIG. 4.

A number of different multilayer plasmonic devices may be formed by combining the device structures shown in FIGS. 3 through 9.

Functional Description

Plasmons, which are quantized oscillations of the free electron gas in a metal or other material, affect how light interacts with a structure and thereby determine the apparent color of the structure. This phenomenon generally occurs through the coupling of surface plasmons with light, to form surface plasmon-polaritons. Tuning the color of metal nanostructures is possible because the plasmon resonant frequency of such structures generally depends on the size, shape, distance between plasmonic particles, and the dielectric properties of the surrounding material. Thus, the optical absorption and scattering spectra (and therefore the color) of metal structures can be varied by altering any one or more of these characteristics.

FIGS. 10A and 10B are partial cross-sectional views depicting a process for color tuning the plasmonic device of FIG. 3. Conventional color tunable, reflective displays using the plasmon resonance of metallic composite structures are realized by either changing the dielectric properties of a medium in which the structures are embedded, or by changing the spatial relationship of these structures. In the devices described in FIGS. 3 through 9, the physical size and shape of discrete particles are altered through a stimulus, to tune the optical absorbance and scattering spectra. As shown, the material of the medium is piezoelectric, and the shapes of discrete particles are altered by applying a voltage to the electrodes.

The expansion amount of each particle is related to the piezoelectric coefficient of the material. For example, lead zicronate titanate (PZT) has piezoelectric coefficient of $3.0 \times 10^{-10}$ m/V, and aluminum nitride (AlN) is $5 \times 10^{-12}$ m/V. When the excitation voltage is applied between the top and bottom electrodes, the piezoelectric expands parallel to the substrate. With the physical expansion of the medium 304, the particles 310 that are embedded will encounter strain and thus expand accordingly. The size and shape of particles determine the plasmon resonant frequency (color). Note: both the particle size and spacing between particles is affected.

Figure 11:
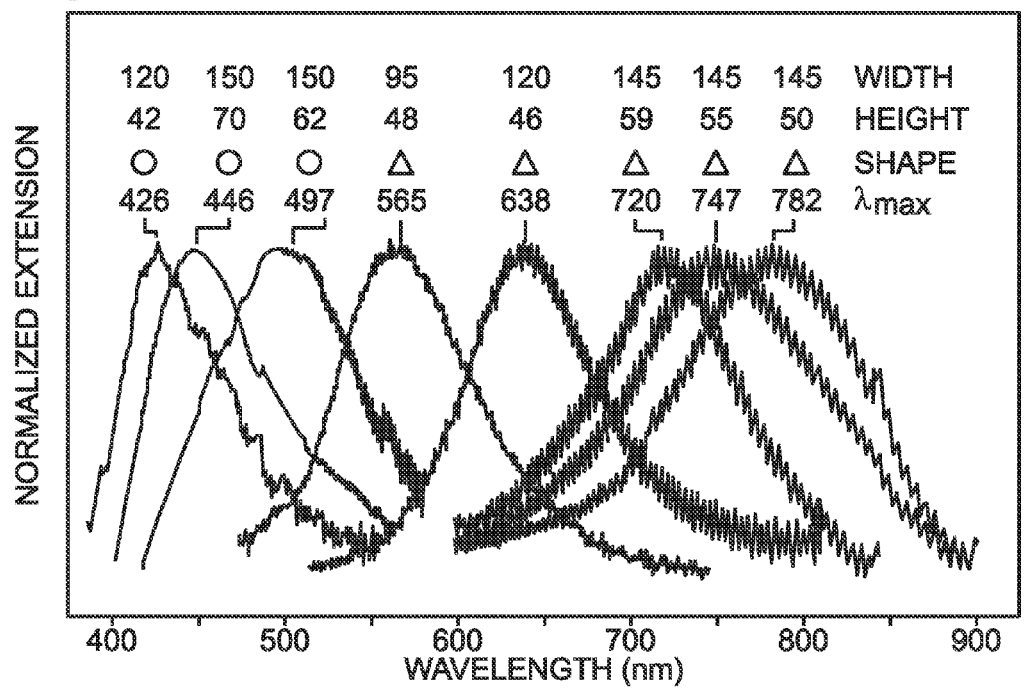
FIG. 11 is a graph depicting the scattering spectrums for different particle sizes and shapes (prior art).

FIG. 11 is a graph depicting the scattering spectrums for different particle sizes and shapes (prior art). The graph shows the effect of size and shape on localized surface plasmon resonance (LS PR) extinction spectrum for silver nanoprisms (represented as triangles) and nanodiscs (represented as circles) formed by nanosphere lithography.

Figure 12A:
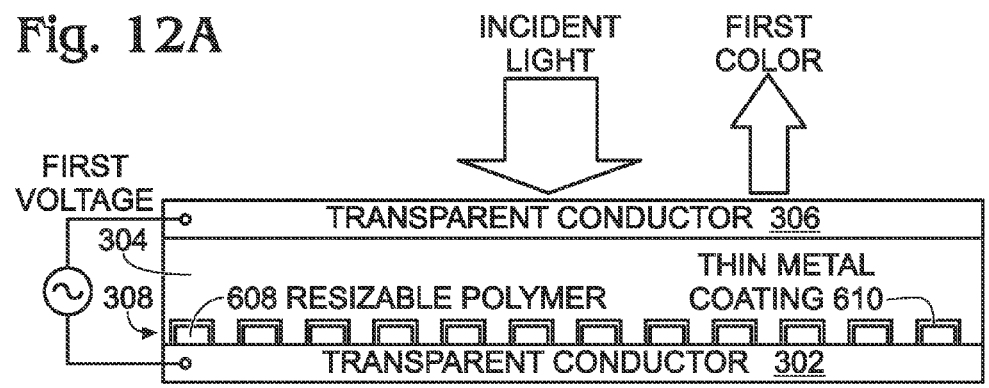
FIGS. 12A and 12B are partial cross-sectional views depicting a process for color tuning the plasmonic device of FIG. 3, when the nanoparticles are a composite shell.
Figure 12B:
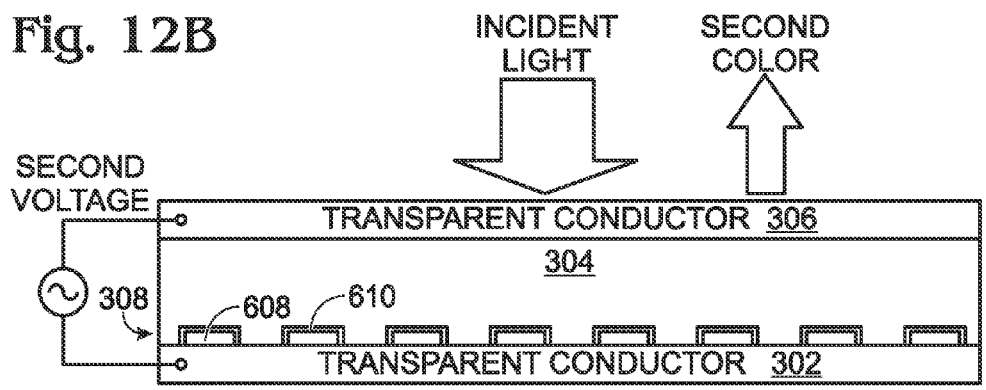

FIGS. 12A and 12B are partial cross-sectional views depicting a process for color tuning the plasmonic device of FIG. 3, when the nanoparticles are a composite shell. As described in the explanation of FIGS. 6A and 6B, the nanoparticles 310 may be composed of expandable polymers 608 and covered with thin metal coating 610, which are resizable by applying electric field applied between the top and bottom conducting electrodes. Piezosensitive expandable polymers, such as $BaTiO_3$ and polyvinylidene fluoride (PVDF), are known to display high piezoelectricity after applying a high electric field. Such a polymer in nanoparticle form can be coated with thin metal to have a plasmonic effect when the light interacts with the structures. When the electric field is applied between the two conducting plates, the inner core polymer 608 expands and contracts, changing the radius (size) of the particle. The particles can be of any size or shape. As shown if FIGS. 12A and 12B, the polymer cores 608 need not necessary be completely covered by the metal coatings 610.

Figure 13A:
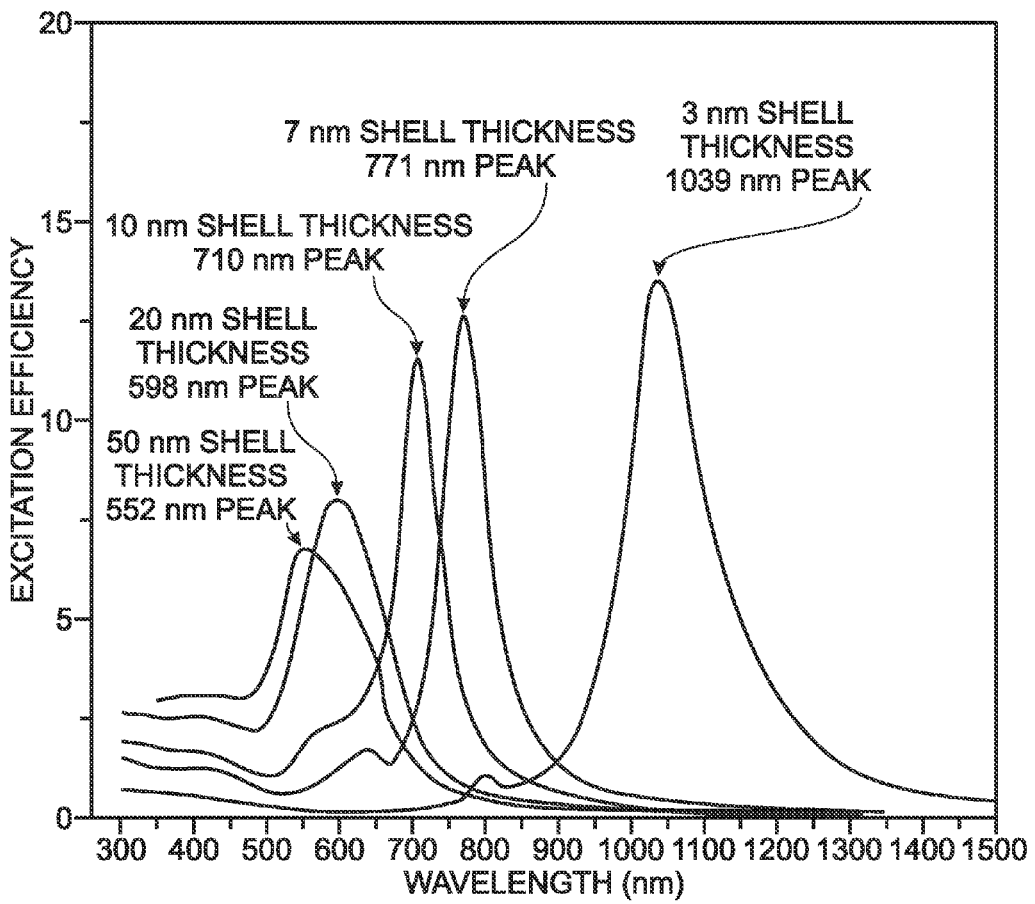
FIGS. 13A and 13B are plots depicting the relationship between wavelength tunability and silica nanoparticles (prior art).
Figure 13B:
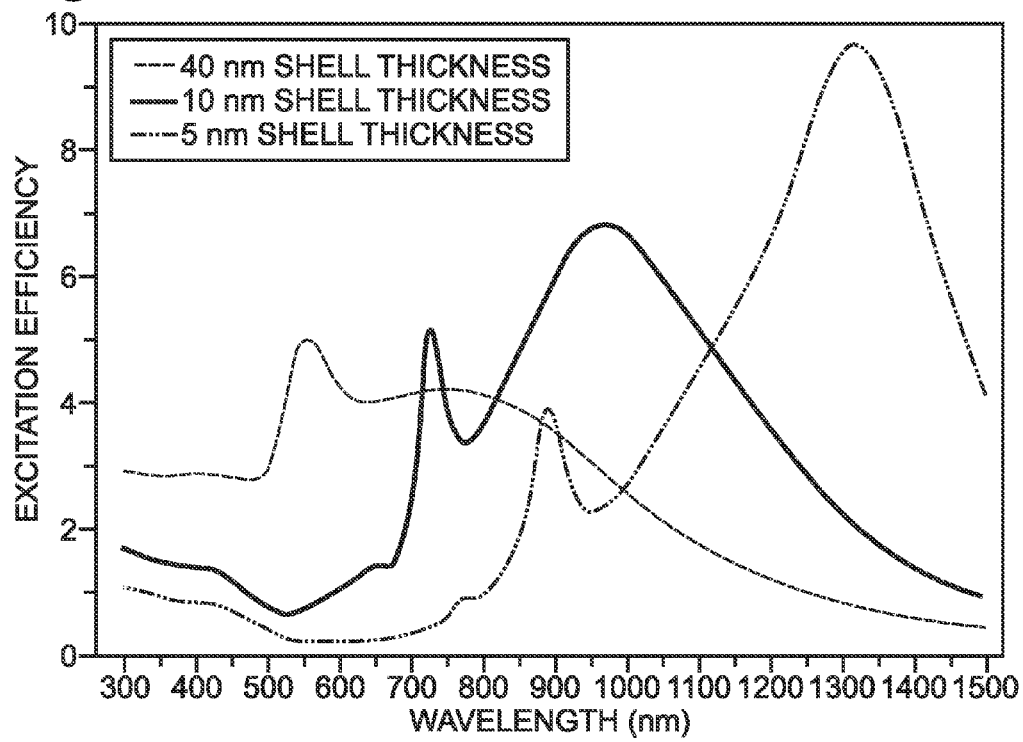

FIGS. 13A and 13B are plots depicting the relationship between wavelength tunability and silica nanoparticles (prior art). FIG. 13A shows the results of altering the outer gold shell thickness from 3 nanometers (nm) to 50 nm, for 50 nm core radius particles. FIG. 13B shows the results of changing shell thickness from 5 nm to 40 nm, for a 100 nm radius core. The graph results show that a change of 10 nm in shell thickness (from 10 nm to 20 nm thickness) can easily alter the optical wavelength greater than 100 nm.

Figure 14A:
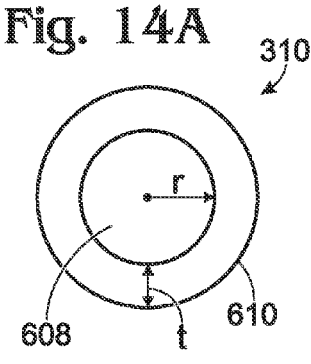
FIGS. 14A and 14B depict nanoparticles having a shell thickness, with core radii of r and 2r, respectively.
Figure 14B:
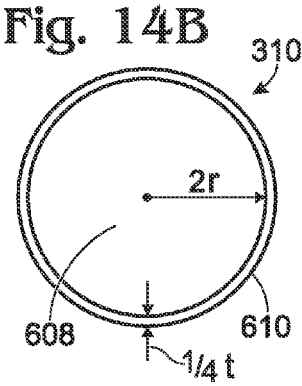

FIGS. 14A and 14B depict nanoparticles having a shell thickness, with core radii of r and 2r, respectively. Extending the relationships presented in FIGS. 13A and 13B, expandable polymer can be implemented as the inner core 608 of the particle 310. FIG. 14A is an example of a polymer nanoparticle with metal outer shell 610 that is at an original state with a polymer core radius of r. FIG. 14B depicts the expansion of the polymer core radius to 2r. When the particle size is expanded by twice the initial radius, the surface area S of the particle increases by four times the initial area, given by the following equation:

$$S = 4\pi r^2$$

Considering the outer shell thickness of metal coating to be small, the change in shell thickness due to the expansion of twice the size of the particle (i.e. four times the surface area of the shell) results in approximately ¼ the initial shell thickness, as given from the following equation:

$$V_{shell} = t_{shell} \times S_{shell}$$

Returning to FIGS. 13A and 13B, the change in ¼ the shell thickness of metal coating implies that the optical wavelength can easily be tuned from the visible color range of green (550 nm) to red (700 nm) with only twice the radius expansion of inner core polymer. This large tuning range is evidence that expandable plasmonic nanoparticles can be employed in reflective color displays.

FIG. 15 is a flowchart illustrating a method for creating colors in the visible spectrum using a physical modulation plasmonic display device. Although the method is depicted as a sequence of numbered steps for clarity, the numbering does not necessarily dictate the order of the steps. It should be understood that in some aspects of the method these steps may be skipped, performed in parallel, or performed without the requirement of maintaining a strict order of sequence. Generally however, the steps are performed in the numeric order. The method starts at Step 1500.

Step 1502 provides a plasmonic device with an electrically conductive bottom electrode, a first dielectric layer overlying the bottom electrode, made from a piezoelectric material having an index of expansion responsive to an electric field, and an electrically conductive top electrode overlying the second dielectric layer. The plasmonic device also comprises a first plasmonic layer including a plurality of discrete plasmonic particles, interposed between the top and bottom electrodes and in contact with the first dielectric layer. Examples of plasmonic devices are presented in FIGS. 3-9, above.

Step 1504 accepts a full-spectrum visible light incident to the top electrode. Step 1506 accepts a first voltage potential between the top and bottom electrodes, generating a first electric field. Step 1508 creates a first index of expansion in the first dielectric layer in response to the first electric field. In response to the first index of expansion, Step 1510 creates a first average spacing between particles in the first plasmonic layer. Step 1512 supplies a first primary color in response to the first refractive index and the first average spacing, where a primary color exhibits a single wavelength peak with a spectral full width at half magnitudes (FWHMs) in the visible spectrum of light.

Step 1514 accepts a second voltage potential between the top and bottom electrodes, different from the first voltage potential, and generates a second electric field different from the first electric field. Step 1516 creates a second index of expansion in the first dielectric layer in response to the second electric field. In response to the second index of expansion, Step 1518 creates a second average spacing between particles in the first plasmonic layer. Step 1520 supplies a second primary color in response to second refractive index and second average spacing.

In one aspect, providing the plasmonic device in Step 1502 includes providing a plasmonic device with plasmonic particles made from an expandable polymer material covered with a metal coating having a size responsive to an electric field. Then, Step 1511 creates plasmonic particles having a first average particle size in response the first electric field, and Step 1512 supplies the first primary color in response to the first refractive index, the first average spacing, and the first average particle size.

Likewise, Step 1519 creates plasmonic particles having a second average particle size in response the second electric field, and Step 1520 supplies the second primary color in response to the second refractive index, the second average spacing, and the second average particle size.

In a different aspect, Step 1522 sequentially accepts a first plurality of voltage potentials between the top and bottom electrodes, sequentially generating a first plurality of electric fields. Step 1524 sequentially creates a first plurality of expansion indexes in the first dielectric layer in response to the first plurality of electric fields. In response to the first plurality of expansion indexes, Step 1526 sequentially creates a first plurality of average spacings between particles in the first plasmonic layer, and Step 1528 sequentially supplies a first plurality of primary colors in response to the first plurality of refractive index and corresponding average spacings. In another aspect, Step 1527 sequentially creates plasmonic particles having a first plurality of average particle sizes in response the first plurality of electric fields, and Step 1528 sequentially supplies the first plurality of primary colors in response to the first plurality of refractive indexes, the first plurality of average spacings, and the first plurality of average particle sizes.

A color-tunable plasmonic device using physical modulation mechanisms is provided, along with an associated tuning method. Examples of specific materials and structures have been used to illustrate the invention. However, the invention is not limited to merely these examples. Other variations and embodiments of the invention will occur to those skilled in the art.

We claim:

1. A method for creating colors in the visible spectrum using a physical modulation plasmonic display device, the method comprising:
   providing a plasmonic device with an electrically conductive bottom electrode, a first dielectric layer overlying the bottom electrode, made from a piezoelectric material having an index of expansion responsive to an electric field, an electrically conductive top electrode overlying the second dielectric layer, and a first plasmonic layer including a plurality of discrete plasmonic particles, interposed between the top and bottom electrodes and in contact with the first dielectric layer;
   accepting a full-spectrum visible light incident to the top electrode;
   accepting a first voltage potential between the top and bottom electrodes, generating a first electric field;
   creating a first index of expansion in the first dielectric layer in response to the first electric field;
   in response to the first index of expansion, creating a first average spacing between particles in the first plasmonic layer; and,
   supplying a first primary color in response to the first refractive index and the first average spacing, where a primary color exhibits a single wavelength peak with a spectral full width at half magnitudes (FWHMs) in the visible spectrum of light.

2. The method of claim 1 further comprising:
   accepting a second voltage potential between the top and bottom electrodes, different from the first voltage potential, and generating a second electric field different from the first electric field;
   creating a second index of expansion in the first dielectric layer in response to the second electric field;
   in response to the second index of expansion, creating a second average spacing between particles in the first plasmonic layer; and,
   supplying a second primary color in response to second refractive index and second average spacing.

3. The method of claim 2 wherein providing the plasmonic device includes providing a plasmonic device with plasmonic particles made from an expandable polymer material covered with a metal coating having a size responsive to an electric field;
   the method further comprising:
   creating plasmonic particles having a first average particle size in response the first electric field; and,
   wherein supplying the first primary color includes supplying the first primary color in response to the first refractive index, the first average spacing, and the first average particle size.

4. The method of claim 3 further comprising:
   creating plasmonic particles having a second average particle size in response the second electric field; and,
   wherein supplying the second primary color includes supplying the second primary color in response to the second refractive index, the second average spacing, and the second average particle size.

5. The method of claim 1 further comprising:
   sequentially accepting a first plurality of voltage potentials between the top and bottom electrodes, sequentially generating a first plurality of electric fields;
   sequentially creating a first plurality of expansion indexes in the first dielectric layer in response to the first plurality of electric fields;
   in response to the first plurality of expansion indexes, sequentially creating a first plurality of average spacings between particles in the first plasmonic layer; and,
   sequentially supplying a first plurality of primary colors in response to the first plurality of refractive index and corresponding average spacings.

* * * * *